No. 640,805. Patented Jan. 9, 1900.
J. W. PHOEBUS.
ART OF MAKING STEREOTYPE MATRICES.
(Application filed July 12, 1898.)
(No Model.)
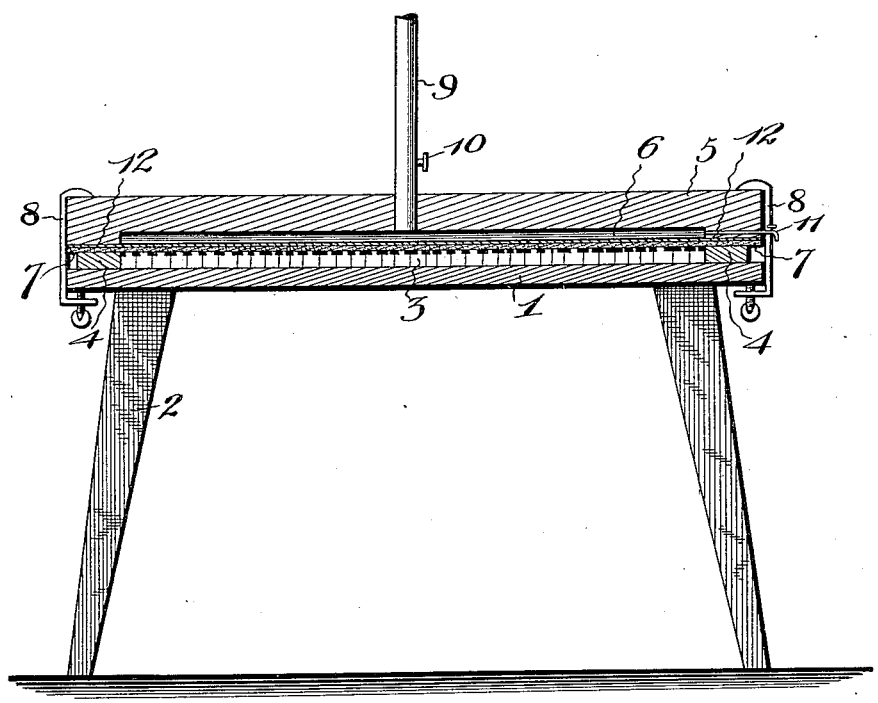
Witnesses
A. Roy Appleman Jr.
D. T. Hathaway Jr.
Jesse W. Phoebus,
Inventor.
By his Attorneys,
C. A. Snow & Co.

UNITED STATES PATENT OFFICE.

JESSE W. PHOEBUS, OF WHEELING, WEST VIRGINIA.

ART OF MAKING STEREOTYPE-MATRICES.

SPECIFICATION forming part of Letters Patent No. 640,805, dated January 9, 1900.

Application filed July 12, 1898. Serial No. 685,786. (No model.)

*To all whom it may concern:*

Be it known that I, JESSE W. PHOEBUS, a citizen of the United States, residing at Wheeling, in the county of Ohio and State of West Virginia, have invented a new and useful Improvement in the Art of Making Stereotype-Matrices, of which the following is a specification.

This invention relates to matrices for stereotype-plates; and it has for its object to provide a new and useful matrix of a simple and inexpensive character which can be produced or manufactured very quickly and with much greater facility than the matrices which are made by the ordinary methods usually resorted to by stereotypers.

In carrying out the present invention one of the essential features thereof is the total absence of heat and moisture during the process of manufacturing the matrix, thereby obviating the objectionable practice of heating or warming the type, while at the same time avoiding the usual delay in waiting for the matrix or mold to dry before being ready for use, as by reason of the entire absence of moisture at any stage of the manufacture of the matrix there is no necessity for warming the type nor for the step of drying, which is common to most methods now in use.

In any process of making stereotype matrices or molds where the types are heated the same must be loosened in the chase, so there will be room for expansion in heating, and the pressure being applied while the types are thus separated from each other necessarily causes them to swell in the body and soon become useless. These objections are fully overcome by the present invention, which dispenses with the heating of the type; and a further object of the invention is to provide means whereby the pressure upon the type is delivered evenly throughout the entire form and is direct and gradual, thereby avoiding injury to the type, as is common in the ordinary "brush-beating" process.

With the present invention the matrix may be made with the form locked up tight, so that there is no space between the types to permit them to swell in the body from the pressure applied, as is the case when the types are heated and loosened up in the manner previously explained, and, furthermore, in carrying out the herein-described method of making the matrix the thin letters—such as "i," "n," "t," "l," &c.—bear pressure proportionate only to the printing-face they present, whereas in the roller process of making matrices thin letters are very quickly impaired or easily destroyed.

With these and other objects in view the invention consists in the novel features hereinafter more fully described, illustrated, and claimed.

In the manufacture of a stereotype-matrix in accordance with the present invention different apparatus may be utilized for the purpose of applying pressure to a superposed type-form and matrix-sheet after the latter has been placed on the type-form; but one form of apparatus for carrying out the process is illustrated in the accompanying drawing, in which the figure of the drawing is a sectional view of a form of press in which the pressure on the matrix-sheet is secured by means of a suitable fluid under pressure, such as air or water.

The matrix forming a part of the present invention is composed of a sheet of soft pulpy material, preferably of wood-pulp, which is as soft and loosely fabricated as possible, although it should be understood that any other material having the same qualities and characteristics as the wood-pulp may be utilized for the purpose. While it is essential that the matrix-sheet be of soft pulpy material, it is also primarily essential to the present invention that this matrix-sheet be absolutely dry, as no moisture whatever is used at any stage in the manufacture of the matrix or mold.

In contradistinction to the matrix-sheet commonly employed in the manufacture of stereotype matrices or molds the matrix-sheet which I employ is not of a laminated character, but is of one piece or sheet of material, and the only preparation necessary to make the sheet ready for use is to finish the side or face thereof which lies next to the type-faces. While this finishing of one side or face of the matrix-sheet may be accomplished in various ways, I preferably accomplish the result by coating the surface of the sheet next to the type with a sizing of diluted glue or any similar substance that will form an elastic glaze.

The sizing of diluted glue may be conveniently applied to the surface of the matrix-sheet by means of a high-pressure spray and when dry may not be more than one three-thousandths of an inch thick. It will of course be understood that the glue sizing will be applied and thoroughly dried before the matrix-sheet will be ready for use, and it is to be noted that the special advantage arising from finishing one side or surface of the matrix-sheet with a sizing of diluted glue is that by so doing the surface of the matrix which is to be placed against the type-faces is made of equal texture throughout and perfectly smooth. The necessity for sizing or finishing the surface of the matrix-sheet next to the type-faces in the manner explained arises from the fact that even under extreme pressure the fabric or grain of the matrix-sheet, whether of paper or pulp, would be somewhat retained and make a surface on the types that would still show the texture of said matrix-sheet. This is fully overcome by preparing the matrix-sheet in the manner described, as after the sizing of the glue is applied the surface of the sheet is uniform throughout, and all threads or hairy fibers in the sheet, especially when made of pulpy paper, would be covered with the sizing, and therefore not impair the appearance of the work.

A matrix-sheet of the character herein described possesses every qualification for producing a good matrix and when placed under pressure on the type-faces sinks sufficiently deep into the interstices between the type-faces to form a stable matrix or mold, it being understood in the art that in order to make a good matrix the substance of which the same is composed should sink into the type-interstices as far as possible, especially in open-page work which contains advertising matter and the like where considerable blank space is exposed on the printed page.

In using the matrix-sheet to produce the stereotype matrix or mold any form of apparatus may be used in which the pressure may be applied so as to bear evenly upon all points of the type-form and matrix-sheet, the result of said pressure being a matrix or mold which will be thinnest and hardest where the sheet has come into contact with the type-faces and thickest and softest where the sinks or interstices exist in the type-form. This matrix is thus placed in the best possible condition for receiving the molten metal to reproduce the type-form in detail.

Referring more particularly to the form of apparatus illustrated in the accompanying drawing, the base or support for the type-form is a flat horizontal stationary supporting-table 1, held in an elevated position by legs or standards 2 and adapted to support thereon the type-form 3, which is tightly locked in the usual chase 4, the said chase and the type-form being designed to rest perfectly flat on top of the said supporting-table. In connection with the supporting-table 1 is employed a stationary cap, slab, or plate 5, which is recessed or hollowed out at its inner side to form a fluid-chamber 6, which lies immediately above the type-form within the chase 4. The fluid-chamber 6, formed at the inner side of the cap, slab, or plate 5, is coextensive with the type-form, and the peripheral edge of the said slab or plate 5 rests directly on the edges of the matrix-sheet 7, which extends beyond the chase 4, and it will be observed that by reason of having the edges of the matrix-sheet interposed between the contacting faces of the table 1 and the slab or plate 5 the said matrix-sheet forms a gasket or packing between these two parts to prevent leakage of the pressure fluid at the points of contact. After a type-form has been placed on the table 1 and the matrix-sheet arranged thereover in the position illustrated the cap, slab, or plate 5 is securely clamped to the table 1 by means of the clamps 8 or similar fastenings. The fluid is then introduced under pressure through the fluid-supply pipe 9 fitted to the cap, slab, or plate 5, and communicating with the inner fluid-chamber thereof and when compressed air is employed for the purpose of forming the matrix or mold the same distributes itself throughout the fluid-chamber 6 and exerts an even and uniform pressure over the entire upper surface of the matrix-sheet, causing the latter to be forced into the type-faces, and thereby reproduce in the matrix or molds the convolutions of said type-faces. When this impression is secured, a suitable cut-off valve 10 in the pipe 9 is closed and the cap, slab, or plate 5 removed; when the matrix will be released and ready for immediate use. A suitable relief-cock connection 11 is made with the fluid-chamber 6 of the cap, slab, or plate 5 and is brought into use when it is desired to relieve the pressure within the chamber. While compressed air is preferably used in connection with the form of apparatus illustrated, still it will be understood that the same results may be secured by hydraulic pressure, in which event water is introduced under pressure through the pipe 9 and into the fluid-chamber 6; but when water is thus used a protecting-sheet of rubber 12 is placed over the matrix-sheet 7 and clamped between the slab or plate 5 and the chase 4, the rubber sheet serving to prevent the matrix from becoming damp. This protective rubber sheet is not used when the matrix is formed under air-pressure.

Other forms of apparatus may be utilized for carrying out the herein-described method of making a matrix or mold for stereotyping, and I would have it understood that various changes in the minor details of the method may be resorted to without departing from the spirit of the invention or sacrificing any of the advantages thereof.

Having thus described my invention, what I claim, and desire to secure by Letters Patent, is—

An improvement in the art of making stereotype-matrices, which consists in preparing a moistureless non-laminated sheet of soft pulpy material solely upon the type-contacting face thereof, with a thin homogeneous elastic glaze of uniform texture throughout, eliminating all moisture from the superficial elastic glaze, and finally impressing the said glazed surface, while in an absolutely dry condition, directly upon a type-form, with the entire absence of both heat and moisture, substantially as described.

In testimony that I claim the foregoing as my own I have hereto affixed my signature in the presence of two witnesses.

JESSE W. PHOEBUS.

Witnesses:
HARRY V. ARKLE,
T. M. GARVIN.